(12) United States Patent
Chessell

(10) Patent No.: US 7,941,454 B2
(45) Date of Patent: May 10, 2011

(54) APPARATUS, METHODS AND COMPUTER PROGRAMS FOR MONITORING PROCESSING IN A DATA PROCESSING SYSTEM OR NETWORK

(75) Inventor: Amanda E. Chessell, Alton (GB)

(73) Assignee: International Business Machines Corporation, Armonk, NY (US)

( * ) Notice: Subject to any disclaimer, the term of this patent is extended or adjusted under 35 U.S.C. 154(b) by 1634 days.

(21) Appl. No.: 10/984,525

(22) Filed: Nov. 9, 2004

(65) Prior Publication Data
US 2005/0125809 A1 Jun. 9, 2005

(30) Foreign Application Priority Data

Dec. 4, 2003 (GB) .................................. 0328095.5

(51) Int. Cl.
*G06F 17/00* (2006.01)
*G06F 7/00* (2006.01)
(52) U.S. Cl. ......................... 707/802; 717/128; 717/131
(58) Field of Classification Search .................... 707/10; 709/220
See application file for complete search history.

(56) References Cited

U.S. PATENT DOCUMENTS

| 6,266,666 B1* | 7/2001 | Ireland et al. .................... 707/10 |
| 6,665,861 B1 | 12/2003 | Francis et al. ................. 717/120 |
| 6,684,387 B1 | 1/2004 | Acker et al. .................... 717/126 |
| 6,772,408 B1* | 8/2004 | Velonis et al. ................. 717/100 |
| 7,188,158 B1* | 3/2007 | Stanton et al. ................. 709/220 |
| 7,711,783 B1* | 5/2010 | Violleau et al. ............... 709/206 |
| 2002/0104071 A1* | 8/2002 | Charisius et al. ............. 717/109 |
| 2004/0068560 A1* | 4/2004 | Oulu et al. ..................... 709/224 |
| 2004/0215762 A1* | 10/2004 | Oulu et al. ..................... 709/223 |
| 2004/0215768 A1* | 10/2004 | Oulu et al. ..................... 709/224 |

FOREIGN PATENT DOCUMENTS

| EP | 1 406 194 | 4/2004 |
| WO | WO03/038608 | 5/2003 |

OTHER PUBLICATIONS

Nett, E. et al., "Enhancing O-O Middleware to Become Time-Aware," 2000, Kluwer Academic Publishers, pp. 97-114.*
Kleijnen, Stans et al., "An Open Web Services Architecture," Mar. 2003, Queue, pp. 38-46.*
Huhns, Michael, "Agents as Web Services," 2002, IEEE, pp. 93-95.*
IBM, IBM Techincal Disclosure Bulletin, Jun. 2001, UK, Issue No. 446, Page No. 1066.*
K. Blackwell, "Using Transaction Analysis for Better Systems Management", Business Integrator Journal, pub. 2001, pp. 10-15.

* cited by examiner

*Primary Examiner* — Luke S Wassum
(74) *Attorney, Agent, or Firm* — Steven M. Greenberg, Esq.; Carey, Rodriguez, Greenberg & Paul

(57) ABSTRACT

Event-generation metadata is used to control the run-time environment of a system implementing a component architecture. A service provider program (40,100) implementing a component architecture is provided with event-generation functions that are configurable by the metadata to generate and send events. The metadata can be implemented as properties of an EJB deployment descriptor associated with a program component (30) for configuring event generation functions of an EJB container (40), to generate and send events to an events service (110). The events can be used to monitor processing of an application.

19 Claims, 4 Drawing Sheets

PRIOR ART

LEGEND

| | |
|---|---|
| 10 | CLIENT APPLICATION |
| 20 | CLIENT DATA PROCESSING SYSTEM |
| 30 | ENTERPRISE BEAN |
| 40 | CONTAINER |
| 50 | SERVER DATA PROCESSING SYSTEM |

LEGEND
10   CLIENT APPLICATION
20   CLIENT DATA PROCESSING SYSTEM
30   COMPONENT
40   CONTAINER
50   SERVER DATA PROCESSING SYSTEM
80   SUPPORT MODULE
90   OBJECT REQUEST BROKER
100  APPLICATION SERVER
110  EVENTS SERVICE

US 7,941,454 B2

APPARATUS, METHODS AND COMPUTER PROGRAMS FOR MONITORING PROCESSING IN A DATA PROCESSING SYSTEM OR NETWORK

FIELD OF INVENTION

The present invention relates to a data processing apparatus and to methods and computer programs for monitoring processing within a data processing system. In particular, the invention can be implemented to generate events within a data processing system.

BACKGROUND

The invention is applicable to computing environments implementing a component model in which computer program components execute within a specific run-time environment. The run-time environment includes a set of well defined services. In some component architectures, the component management services are implemented within a program construct called a container. The components run within the container, or wherever the services are implemented. A common feature of component architectures is to be able to specify the exact run-time environment required by a component using metadata. This enables the desired run-time environment to be configured without explicit calls to the run-time services having to be programmed within the component code itself. The metadata may be stored in the header of the component or a separate file.

The Enterprise JavaBeans™ (EJB) architecture is an example of a component architecture for the development and deployment of component-based distributed business applications. The EJB specification from Sun Microsystems, Inc (for example, the Enterprise Java Beans Specification version 2.0, final release, published in August 2001, and earlier versions) specifies how developers can develop software components that can be accessed remotely, and how vendors of EJB containers should support those components.

Enterprise beans are server-side software components written in the Java™ programming language, which comply with the EJB specification's server-side component model. Depending on the type of enterprise bean used, capabilities such as persistence, transactions, security and multiple concurrent users can be managed automatically by an EJB container (as described below). This enables the developer of an enterprise bean to rely on an EJB container to provide a number of generic services and to focus their development effort on developing specific business logic. Therefore, the EJB architecture simplifies the task of developing distributed, transactional business applications, and the task of adding new capabilities to such applications.

FIG. 1 is a schematic representation of the architecture of a distributed, client-server application in which the server-side is implemented using EJB technology. A 'client' program 10 is running on a client data processing system 20, and sends requests via an EJB container 40 for execution of the methods of an enterprise bean 30 which runs on a server data processing system 50. Although the client program may reside on the same computer as the enterprise bean in non-distributed solutions, in the example of FIG. 1 the client and server data processing systems (20 and 50) are remote from each other. The client program 10 is not limited to a specific type of computer program, and may be another enterprise bean.

The container 40 is a host for enterprise beans and, as mentioned above, provides a variety of generic system services (such as handling remote access, transaction processing, persistence or security) for use by individual enterprise beans 30 at run time. A method call from the client application 10 to a contained enterprise bean 30 is passed through the EJB container 40. The EJB container performs services on-behalf of the targeted enterprise bean and then passes the client's call to the enterprise bean 30. The involvement of the EJB container 40 is transparent to the requesting client program, in the sense that the client program perceives the communication as a direct communication between the client program and the enterprise bean 30. Typically, a container will manage many beans simultaneously. The enterprise beans 30 each implement one or more business-specific methods of a respective application, and each implement methods of the EJB container application programming interface (API) which are required to use the services of the container.

The behaviour of the container is controlled by metadata. In the EJB specification, this metadata is referred to as "deployment descriptors". Each deployment descriptor instructs the container on how to set up a particular system service in order to provide the correct processing environment for the enterprise bean.

The concept of the deployment descriptor is a powerful one since it reduces the coding required within the component and makes it easier to tailor the component's run-time environment without needing to modify the implementation of the component itself. Consequently, products such as IBM Corporation's WebSphere Application Server Enterprise Edition and BEA's WebLogic Server have added new types of deployment descriptor to control their proprietary services. By using deployment descriptors, these products are able to offer a richer run-time environment to the component than is defined within the EJB specification. WebSphere and IBM are trademarks of International Business Machines Corporation.

SUMMARY

A first embodiment of the present invention provides a service provider program implementing run-time services for program components according to a component model. The service provider program implements event-generation functions that are configurable in response to component-specific event parameters within metadata of a program component. The metadata configures the service provider program to generate desired events in response to a method call directed to the program component. The events can be used to monitor processing of an application that includes the program component.

The service provider program may be a container or another service provider entity within a component architecture. The run-time services provided by the container or other service provider may include transaction handling, security or remote access services, or other services that are generic to a number of different business applications. The hosted program components can implement business-specific functions while relying on the service provider for the generic functions. The hosted program components may be reusable software building blocks for use in a number of different applications.

The inventor of the present invention has also defined a new type of metadata for controlling a run-time environment of a component architecture to enable event generation. In one embodiment, a new type of deployment descriptor is provided for configuring an EJB container. The new deployment descriptors are used to trigger a notification that the application has reached a particular point in its processing—as distinguished from known methods which use deployment descriptors to set up the run-time environment for the component being called. The notification (also known as an event) describes the particular point in the application. In one embodiment, the act of triggering a notification results in the notification being passed to an events service. This service can be configured to save the event in a data repository for later processing, and/or to call an application or system component that has registered an interest in that particular type of event.

A benefit of using an events service is that external applications and users can monitor or record the progress of the business application. If the events service is saving events to a repository in permanent data storage, then the repository can provide an audit trail for the business activity. If a second component registers to receive certain types of events in-line (i.e. as part of the trigger call to the events service) then the second component can dynamically change the run-time environment of the original component. This may involve activating additional events or flagging the transaction to roll back. Alternatively, registered components could initiate other business processes as a result of the event notification.

An embodiment of the present invention combines the benefits of using an events service with the benefits of being able to define calls to the events service using metadata. This avoids the need to modify the program code of the component itself.

One embodiment of the invention provides an Enterprise JavaBean container that is configurable by a description of method-specific event parameters within an enterprise bean deployment descriptor. The deployment descriptor parameters can configure event-generation functions of the EJB container to generate a desired event in response to receipt of a request for execution of the respective method of the enterprise bean.

A further embodiment of the present invention comprises a system implementing the NET component architecture from Microsoft Corporation. A component defines metadata at the top of the component's code file, which defines the component's run-time environment. This metadata is interpreted by the Microsoft .NET run-time environment, to set up the component's run-time environment. Similar to the alternative component architectures described above, new metadata can be associated with specific methods of the components and new functions can be added to service providers within the Microsoft NET environment to trigger events in accordance with the metadata.

Other embodiments of the invention use servlet or portlet deployment descriptors to provide the event parameters for controlling event generation.

A further embodiment of the invention provides a method for monitoring processing, for a data processing system comprising a service provider program which implements run-time services for components in accordance with a component model. The method includes the step of associating metadata with at least one component of the data processing system. The metadata includes component-specific event parameters. The method also includes the step of configuring event-generation functions of the service provider program, using the component-specific event parameters within the metadata, to enable generation of component-specific events in response to requests for invocation of a method of the component.

A further embodiment provides a data processing apparatus which includes a data processing unit, a data storage unit, at least one program component comprising program code for implementing at least one method, and a service provider computer program implementing run-time services for program components according to a component model. The service provider program receives requests for invocation of methods of the program components, and forwards the requests to the respective components. The service provider program comprises event-generation functions that are configurable by event parameters within metadata associated with a component to enable the service provider program to generate a desired event in response to a request for invocation of a method of the component.

A method as described above may be implemented using a service provider computer program that provides run-time connectivity and management services to component programs in accordance with a component architecture. The computer program code may be made available as a program product comprising program code recorded on a recording medium. The 'recording medium' may be system memory, a CD-ROM, or an electronic data transfer medium, for example.

BRIEF DESCRIPTION OF DRAWINGS

Embodiments of the invention are described below in detail, by way of example, with reference to the accompanying drawings in which.

DETAILED DESCRIPTION OF PREFERRED EMBODIMENTS

Figure 1:
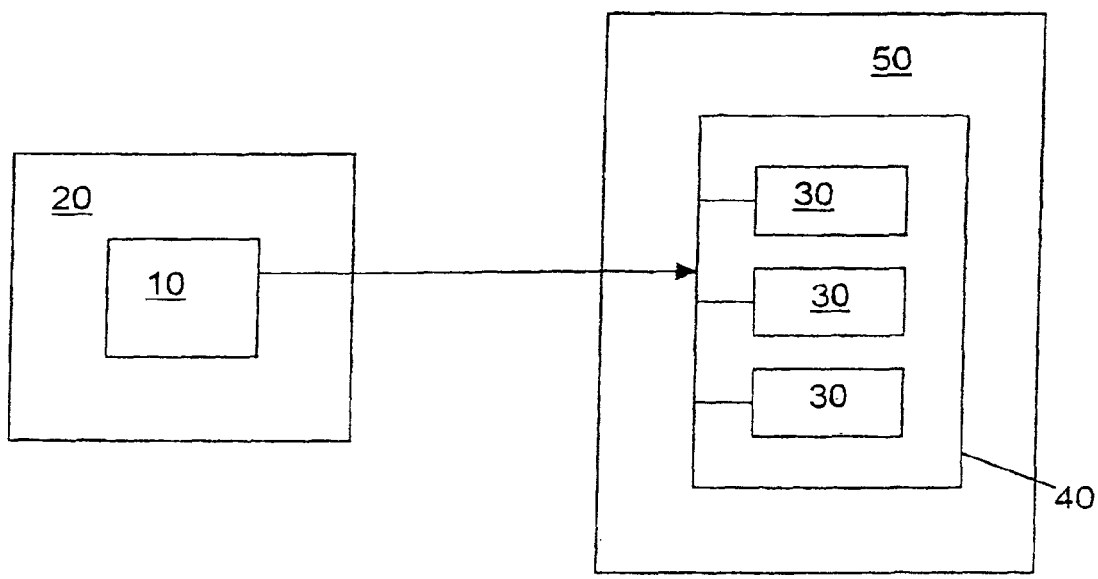
FIG. 1 is a schematic representation of a distributed client-server application implementing the EJB architecture, as is known in the art.

It will be apparent to a person skilled in the art that individual steps of the method described below can be implemented in computer program code and that a variety of programming languages and coding implementations may be used to implement the methods described herein. Moreover, the computer programs are not intended to be limited to the specific control flow described below, and one or more of the described steps of a program may be performed in parallel rather than sequentially as described. One or more of the operations described in the context of a computer-program-controlled implementation could alternatively be performed by a hardware electronics component.

Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and methods described below are not inherently related to any particular computer or other apparatus. Various general purpose machines may be used with programs in accordance with the teachings herein. Alternatively, the construction of more specialised apparatus to perform the required method steps may be appropriate.

In addition, the present specification also discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

The present invention may be implemented, for example, within an application server computer program that implements a component model, such as an application server implementing the J2EE standard and the Enterprise Java Bean architecture. For example, the invention may be implemented within IBM Corporation's WebSphere Application Server product which implements an EJB container for hosting enterprise beans. The system components and interactions between the components during performance of an embodiment of the invention are described in detail below.

Event parameters within a component-specific and method-specific deployment descriptor can be used to configure an EJB container to generate events on behalf of the component (enterprise bean) and to send the events to an event service. J2EE deployment descriptors are specifications that define components and operating parameters of a J2EE application (such as a Web application). The deployment descriptors can be used when registering an enterprise bean or other servlet with a container, to define initialization parameters, and to define security parameters and other properties. The deployment descriptors can be written in Extensible Markup Language (XML) notation, as in the case of standard J2EE 'web.xml' deployment descriptors and some proprietary deployment descriptors provided by EJB container vendors. The deployment descriptors can be packaged within an application and interpreted by an EJB container within a J2EE-compliant application server. Use of XML deployment descriptors is known for setting up environments for handling of method calls.

However, the present invention uses deployment descriptors for the new purpose of enabling event generation before and after a method call. The deployment descriptors can be created at application assembly time, without having to re-code individual enterprise beans.

Figure 2:
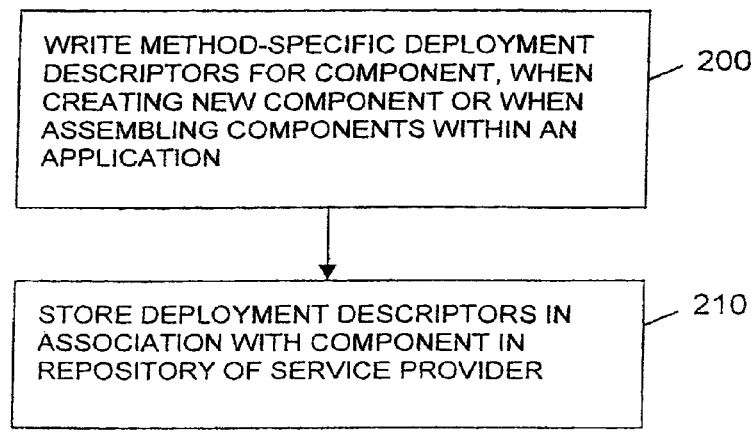
FIG. 2 represents the steps involved in configuring a container or service provider of a container environment to enable event generation, according to an embodiment of the invention.

As shown in FIG. 2, a method of configuring event-generation functions of a container according to an embodiment of the invention comprises a first step of writing 200 deployment descriptors for specific methods of an enterprise bean (or another component of a component architecture). Event parameters can be written as XML deployment descriptors for each method of each component for which event generation is required. The deployment descriptors can be written when registering an enterprise bean (or other component) with a container, or subsequently when assembling an application from existing components. If monitoring requirements change during monitoring, the deployment descriptors for a component can be modified to reconfigure the event monitoring functions of the container to conform to the new requirements. The deployment descriptors are then stored 210 in a repository that is accessible by the container. Each deployment descriptor in the repository is typically associated with a specific method of a specific component.

The container is then able to respond to method invocation requests by checking the stored event parameters within relevant stored deployment descriptors, and the container's event generating functions are configured by the identified event parameters to generate desired events and to forward them to an events service. The use of deployment descriptors at run-time is described in more detail below with reference to FIG. 3 and FIG. 4.

An event instance may be created each time a specific method is called on an enterprise bean of a relevant type. The event data can include values from the method's parameters and the result of the method. For example, a method which can be called on an example enterprise bean is the method calculateOrderTotal( ) for calculating the total cost of a set of purchases within a purchase order. The method calculateOrderTotal( ) is called on a session bean, which is an enterprise bean that does not retain state information. The specific implementation of the method is not important for the purpose of illustrating the present invention, but let us assume that an application requires notification of high value orders for which the total exceeds a threshold value. The application registers interest in receiving such notifications from an event service. The event service may implement a publish/subscribe communication service, for example, to which multiple applications can subscribe.

An example of the information that can be added to a deployment descriptor to control event generation in response to requests for this method is set out below:

```
<event    name="HighValueOrder
MethodName="calculateOrderTotal"
When="after"
EventProfile="orderProcessingEventProfile"
  mode="inline">
       <property name="customerNo"
parameter="customerNumber"/>
           <property name="customerName"
method=getCustomerName(customerNo)"/>
           <property name="customerStatus"
method=getCustomerStatus(customerNo)"/>
           <property name="orderNo"
parameter="orderNumber"/>
       <property name="orderType"    value="Customer"/>
       <property name="orderValue"/>
    </event>
```

The attributes of the above deployment descriptor information are as follows:

methodName—the name of the method that the deployment descriptor applies to.

when—whether the event is created before or after the method call. This attribute may be set to "before" or "after". The default is "after", in the absence of a specific indication of when the event generation is required.

mode—how the event should be processed. Mode "inline" means the event instance should be processed synchronously in the current transaction. Mode "associated" means the event is accepted into the event infrastructure as part of the current transaction but may be processed asynchronously. Mode "independent" means the event is generated in an independent transaction. The default mode in the absence of a specified mode is "inline".

property—an event may have an arbitrary number of name-value pair properties associated with it. Each occurrence of the "property" element describes how to set one of the event's properties. There is always a "name" attribute. This specifies the name of the property. In addition, there may be a "value" attribute, a "method" attribute, a "parameter" attribute, or none of these.

name—specifies property name value—defines the exact value to set the property to method—defines another method on the bean to call. The value returned from this other method is used to set the value of the property parameter—defines which of the input parameter values to set the property to eventProfile—indicates where to connect to the event service. This over-rides the default setting for the server.

Thus, individual properties may have a specific value (the characters specified exactly, as in the example: value="OrderDetails") or a parameter may be set such that the data currently stored in the method's relevant parameter is used (for example, a property parameter="orderDetails" will call the current parameter "orderDetails"; and the method could be bean.confirmOrder(orderDetails). A property may include an identification of a specific named method to be called such as in the above example:
property name="customerName"
method="getCustomerName (customerNo)"

In this case, the specified method on the bean is called and the method's return value is used to set the property in the event.

If none of "value", "method" or "parameter" are specified, and the timing parameter is set to "when=after", the return value from the method is used.

A deployment descriptor such as the above example can be written for an enterprise bean when assembling enterprise beans to create a new application. The deployment descriptors are provided to the EJB container, which stores received deployment descriptors in a repository associated with their enterprise beans.

Figure 3:
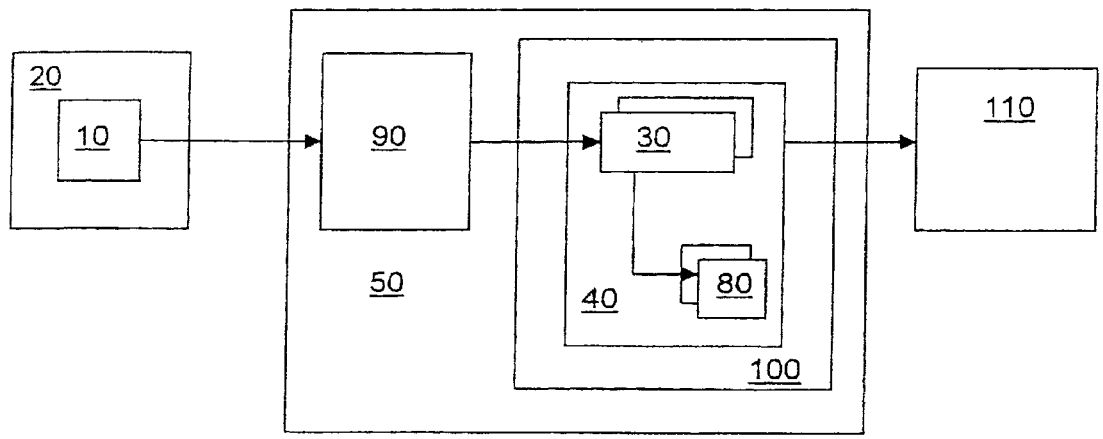
FIG. 3 is a schematic representation of the processing flow of a method request sent to a component within an application server, according to an embodiment of the invention.

FIG. 3 represents the processing flow when a method request is sent to a component 30. The request is received from the network through an Object Request Broker (ORB) 90. The ORB 90 identifies the container 40 of the target component 30 from information within the request and passes the request to the container 40. The container is a program construct of an application server 100, which may be running on the same computer system 50 as the ORB 90.

The EJB container 40 includes the following functions to provide support for the new type of deployment descriptors:
1. Firstly, a support module 80 of the container checks whether event generation details have been stored in association with the container. Just before a method is called on an enterprise bean by the container, the support module 80 of the container 40 checks whether an event generation deployment descriptor has been stored for the requested component and method, and whether the "when=before" attribute has been set. If this attribute has been set, the other attributes of the deployment descriptor are used to create the event object and pass it to an events service 110.
2. Secondly, the support module 80 for checking for event details executes just after a method returns control from a bean to the container. The container checks whether an event-generation deployment descriptor is present with the "when=after" attribute set. If the "when=after" attribute is set, or the deployment descriptor has no timing parameter such that the default "when=after" applies, the other attributes of the deployment descriptor are used to create an event and pass it to the events service 110.

In the above example of high value order events, the calculated total value for the order is returned to the container by the enterprise bean. The container determines that a relevant event generation deployment descriptor is stored for this component and method, and checks the 'when=?' parameter. Having determined that 'when=after' has been set for an event, the container compares the calculated total value result with a predefined threshold to determine whether the total qualifies as a high value order. If the total exceeds the threshold, the EJB container uses the metadata of the deployment descriptor to generate an event that includes the calculated total order value provided by the enterprise bean.

The event comprises a notification sent to the event service, and the event service publishes the event information to registered subscribers. The events service provides interfaces for other components to register an interest in receiving particular types of events. The events service may also write selected events to a data repository.

The following is a pseudocode example showing the new container functions for calling the events service:

```
Just before the method on the bean is called:
    If there is an event deployment descriptor for this method
        If the deployment descriptor has "when=before" set
            Create an event object
            Set the parameter values as properties using the
                "properties" information in the deployment descriptor
            Pass the event, eventprofile and mode value to the
                event service
        End
    End
<call the bean here>
Just after the method on the bean returns:
    If there is an event deployment descriptor for this method
        If the deployment descriptor does not have "when=before" set
            Create an event object
            Set the parameter values as properties using the
                "properties" information in the deployment descriptor
            Pass the event, eventprofile and mode value to the
                event service
        End
    End
```

The new functions of the EJB container can be implemented within a set of support modules or objects within the container. One or more support modules or objects can be provided for each of a plurality of deployment descriptor types. Each support module recognizes and interprets deployment descriptors of its respective type, and uses the information within the deployment descriptors of this type to generate notifications to the event service.

The event service receives each generated event and triggers additional work according to its configuration (such as storing the event details, publishing the event details to registered subscribers, etc).

The sequence of processing steps described above with reference to FIG. 3 is represented in the schematic flow diagram of FIG. 4. When the EJB container 40 receives 300 a method invocation request from the Object Request Broker 90, the EJB container identifies the targeted component 30 and calls a support module 80 of the container with the component identifier and requested method name. The support module 80 accesses a repository of deployment descriptors to determine 310 whether a deployment descriptor has been set for this method. If there is no deployment descriptor in the repository for the requested method, the event generator routine of the container ends 320. If a deployment descriptor is identified, a check is performed 330 of whether the deployment timing parameter has been set to "when=before", indicating a requirement to generate and forward an event prior to calling the method on the enterprise bean (or without awaiting completion of execution of the method). If the timing parameter has not been set to "before", the event generator routine ends 320.

If the deployment descriptor identified for the requested method includes timing parameter "when=before", an event object is created 340 and event properties (parameters, values and method identifiers) within the deployment descriptor are imported 350 as properties of the created event object. The properties are also used to control the sending 360 of the event object to an events service, and in some cases to control onward processing or distribution of the event information. The event, event profile and mode value are sent to the events service, and then the event generation routine ends.

Figure 4A:
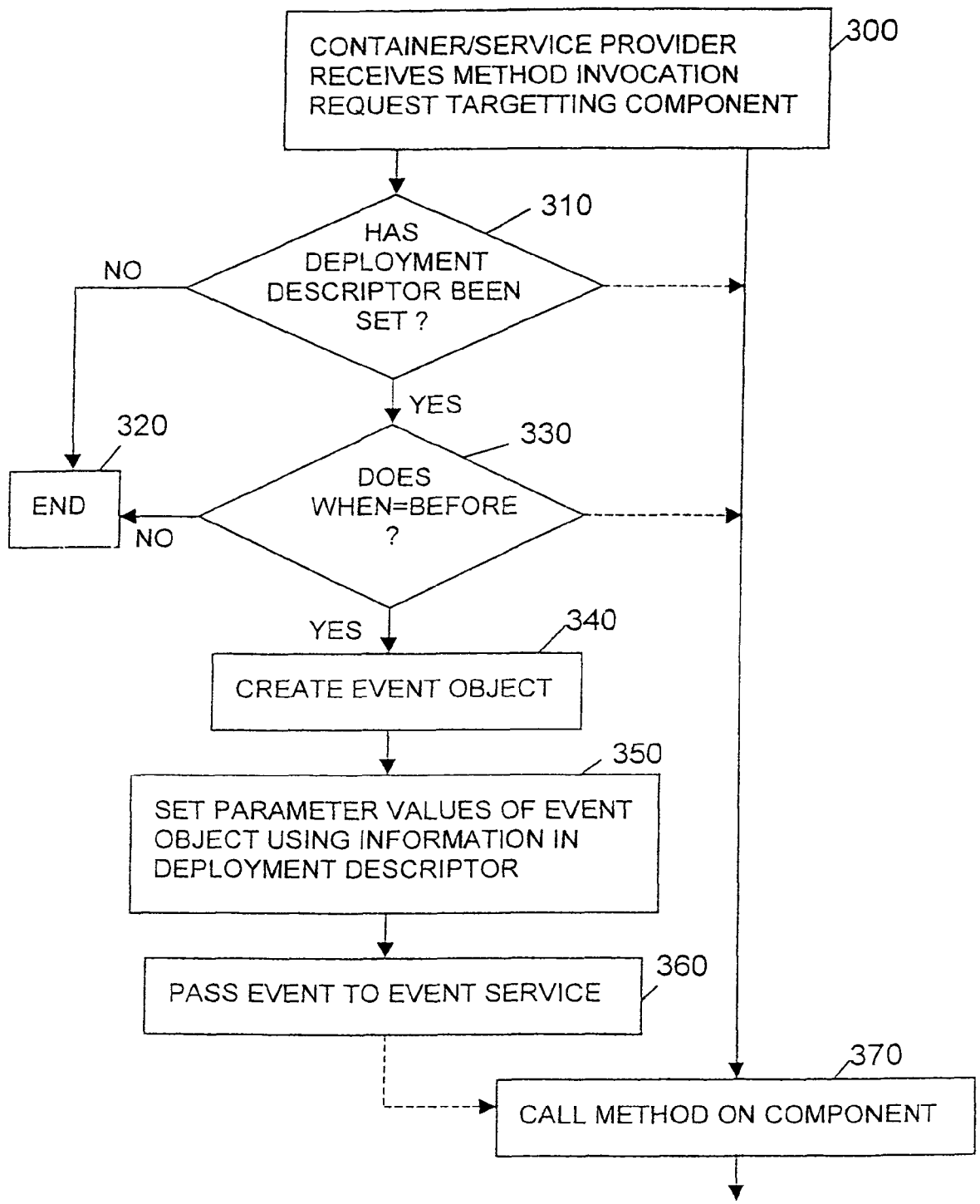
FIGS. 4A and 4B (hereinafter referred to as FIG. 4) are flow diagrams showing the steps of a method of event generation according to an embodiment of the invention.

As shown by solid arrows in FIG. 4A, the requested method of the enterprise bean may be called 370 in parallel with the event generation routine of the container. Alternatively, the method may be called on the container in response to completion of the event generation subroutine (as represented by the arrows shown in broken lines in FIG. 4A) instead of in parallel.

Figure 4B:
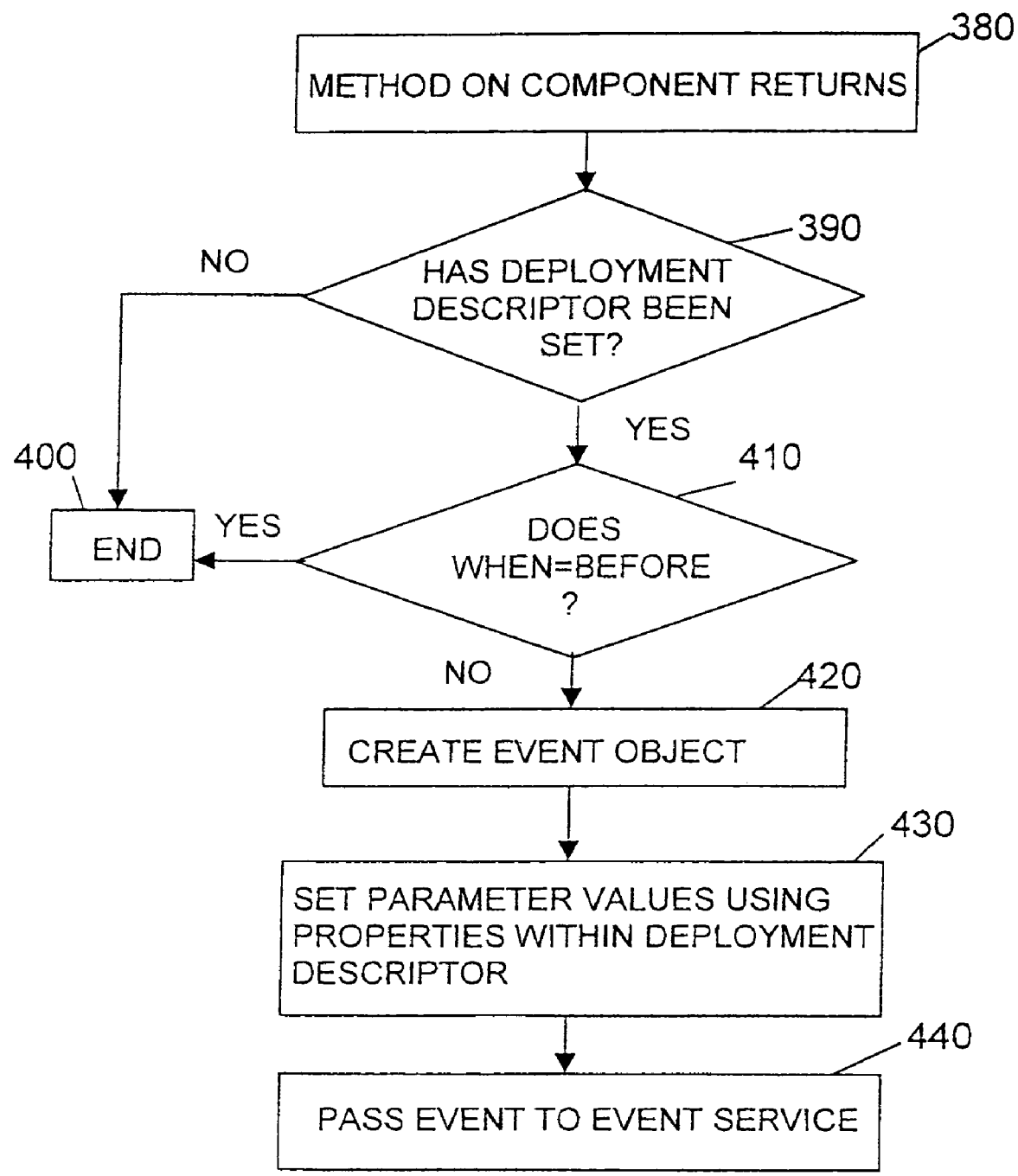

After the method on the enterprise bean returns 380, the support module 80 of the container 40 checks 390 whether a deployment descriptor exists for the method and ends 400 the event generation routine if no deployment descriptor is stored in the repository. The support module also checks 410 whether any identified deployment descriptor has the timing property set to "when=after", or has no specified timing property which defaults to "when=after". This may be performed by checking for the property value "when=before", and ending the event generation routine if "when=before", as shown in FIG. 4B. If the timing property is set or defaults to "when=after", a new event instance is created 420 and the properties of the identified deployment descriptor are used to set 430 the event parameters. The event, event profile and mode value within the deployment descriptor are then sent 440 to the events service.

Thus, deployment descriptors or similar metadata can be attached to components such as J2EE artefacts when they are created or when applications are assembled. The deployment descriptors are used by a container or other run-time environment implementing the component architecture, to control generation of events at run-time before and/or after a method call. The container or service providers of the run-time-environment recognize and interpret deployment descriptors that define events to be generated. In this way, the generation of events becomes the responsibility of the container or service provider instead of requiring event generation methods to be written into components such as enterprise beans. The events can be used to track the flow of processing of an application, and if the tracking requirements change then event generation can be changed merely by changing the deployment descriptors.

Examples are described above of alternative implementations of the invention regarding parallel or sequential performance of method steps, and alternative component architectures in which the method may be implemented. It will be appreciated by persons skilled in the art that additional variations and modifications may be made to the specific methods, apparatus and computer programs described above within the scope of the present invention.

According to embodiments described in detail above, metadata associated with a method of a component can be specific to an individual one of a plurality of applications that use the component program. This can be achieved, for example, by instantiating a separate instance of the component program for each separate application and associating different metadata with each component instance. A number of alternative embodiments can be used to achieve application-specific event management, as described above.

One alternative embodiment employs application-type-specific event parameters within the component-specific metadata. This may be implemented by adding a new field to a deployment descriptor (or similar component-specific metadata). The event generation functions of the service provider program can check for an application-type field, to ensure the appropriate application-type-specific metadata is selected each time a component executes. Another implementation comprises assigning an application type to metadata associated with an entire application (for example in an EAR file).

A further alternative embodiment is to add an application type property to a scoping mechanism implemented within an application server which includes the service provider program (for example, a container). Such a scoping mechanism assigns a set of properties to a thread, and the properties are read by the application server run-time or the specific service provider program (container). This enables the same property value to be assigned across a set of nested method calls.

What is claimed is:

1. A computer-implemented method for monitoring data processing, for a data processing apparatus comprising a service provider program implementing run-time services for program components in accordance with a component model, the method comprising the steps of:
   associating metadata with at least one program component of the data processing apparatus, the metadata comprising component-specific event parameters; and
   configuring event-generation functions of the service provider program, using the component-specific event parameters within the metadata, to enable generation of component-specific events in response to requests for invocation of a method of the program component.

2. The method of claim 1, further comprising:
   responding to a request for invocation of a method of the program component by using the configured event-generation functions to generate a component-specific event.

3. The method of claim 2, further comprising:
   forwarding the generated event to an events service identified from the event.

4. The method of claim 2, wherein the step of generating a component-specific event comprises:
   checking a repository to determine whether event parameters are stored in the repository in association with the requested method and whether stored associated event parameters include an event timing parameter specifying a requirement for event generation prior to completion of the requested method; and
   in response to a positive determination that the event parameters include an event timing parameter specifying a requirement for event generation prior to completion of the requested method, generating an event including at least one of said associated event parameters.

5. The method of claim 1, further comprising:
   passing the method request to the program component implementing the method;

in response to the requested method of the program component completing its execution and returning processing control to the service provider program, checking a repository to determine whether event parameters stored in the repository in association with the requested method indicate a requirement for event generation after completion of the requested method; and in response to a positive determination that the event parameters indicate a requirement for event generation after completion of execution of the requested method, generating an event including at least one of said associated event parameters.

6. The method of claim 1 wherein the step of associating metadata with a program component comprises storing the metadata together with a program component identifier in a repository accessible by the service provider program.

7. The method of claim 1, wherein the service provider program is a container implementing the Enterprise JavaBeans component architecture, and wherein the metadata including event-generation parameters is implemented within EJB deployment descriptors.

8. A computer-implemented method for configuring a service provider program of a data processing apparatus implementing a component architecture to enable event generation, the method comprising:

associating metadata with at least one program component of the data processing apparatus, the metadata comprising component-specific event parameters; and configuring event generation functions of the service provider program, using the component-specific event parameters within the metadata, to enable generation of component-specific events in response to requests for invocation of a method of the program component.

9. A data processing apparatus, comprising:
a data processing unit;
a data storage unit;
at least one instantiable program component comprising program code running on said data processing unit for implementing at least one method; and
a service provider computer program implementing run-time services for program components according to a component model, the service provider being configured to receive requests for invocation of methods of the program components and to forward the requests to the respective program components, wherein the service provider program comprises event-generation functions which are configurable by event parameters within metadata associated with a program component to enable the service provider program to generate a desired event in response to a request for invocation of a method of the program component.

10. The data processing apparatus of claim 9, further comprising:

an events service configured to receive events generated by the service provider program and to make event information available to an application program which requires event information.

11. The data processing apparatus of claim 10, wherein the events service comprises a repository for storing received event information and a publish/subscribe communication mechanism for publishing event information to registered subscriber application programs.

12. A computer program product, comprising program code recorded on a computer readable storage medium, the program code comprising:

a service provider computer program implementing run-time services for program components according to a component model, the service provider being configured to receive requests for invocation of methods of the components and to forward the requests to the respective components, wherein:

the service provider program comprises event-generation functions that are configurable by event parameters within metadata associated with a component to enable the service provider program to generate a desired event in response to a request for invocation of a method of the component.

13. The computer program product of claim 12, comprising a container entity of a component architecture in which container entities provide the run-time services for the program components.

14. The computer program product of claim 13, wherein the container entity implements the Enterprise Java Bean architecture.

15. The computer program product of claim 14, wherein the container entity is configurable by event parameters within an EJB deployment descriptor.

16. The computer program product of claim 12, comprising a service provider program implementing a Web services architecture.

17. The computer program product of claim 12, wherein the event generation functions comprise an event generator function and an event transmitter function for transmitting generated events to an events service separate from the service provider program.

18. The computer program product of claim 12, further comprising:

program code for checking a repository to determine whether event parameters are stored in the repository in association with the requested method and whether stored associated event parameters include an event timing parameter specifying a requirement for event generation prior to completion of the requested method; and program code, responsive to a positive determination that stored associated event parameters include an event timing parameter specifying a requirement for event generation prior to completion of the requested method, generating an event including at least one of said associated event parameters.

19. The computer program product of claim 12, further comprising:

program code for passing the method request to the program component implementing the method;

program code, responsive to the requested method of the program component completing its execution and returning processing control to the service provider program, for checking a repository to determine whether event parameters stored in the repository in association with the requested method indicate a requirement for event generation after completion of the requested method; and program code, responsive to a positive determination that the event parameters indicate a requirement for event generation after completion of execution of the requested method, for generating an event including at least one of said associated event parameters.

* * * * *